2,901,468
Patented Aug. 25, 1959

2,901,468

PROCESS FOR MANUFACTURING NITROGEN-CONTAINING POLYMERIZATES INSOLUBLE IN WATER

Karl Meinel, Burghausen-Upper Bavaria, Germany, assignor to Wacker-Chemie G.m.b.H., Munich, Germany, a corporation No Drawing. Application July 1, 1953
Serial No. 365,518

Claims priority, application Germany November 8, 1952

4 Claims. (Cl. 260—85.5)

This invention relates to the production of water insoluble nitrogen-containing polymerizates, and it has for its object to provide a novel and improved process for this purpose.

Another object of the invention is to provide a simple and efficient process for producing water insoluble polyacrylamide or copolymers of polyacrylamide and polyacrylonitrile.

Various other objects and advantages will be apparent as the nature of the invention is more fully disclosed.

Polyacrylamide or copolymers thereof with polyacrylonitrile have found little favor for technical purposes because of their solubility in water. Their applicability, however, is considerably increased if they can be made insoluble in water.

I have now discovered that this desirable result can be achieved if the above-mentioned polymerizates are heated either in the presence of carboxylic acid anhydrides, or by themselves without said anhydrides. The insolubility in water occurs in the latter case at temperatures above 100° C., e.g. at 140° C., with the heating being accomplished in about 30 minutes. In a considerably shorter time, e.g. in a few minutes, water-insolubility is attained at 200° C. The heating may preferably be done in such a manner that the temperature of the polymerizate is allowed to rise gradually, or by permitting the material to remain a longer time at several different temperature levels. It is preferable to operate in the absence of oxygen, or in the presence of non-oxidizing gases, in order to prevent discoloration. The heating can also be done in inert liquids. The cleaner the initial product is, the less do form-changes, such as swelling up and the like, occur.

If the heating is performed in the presence of carboxylic acid anhydrides, e.g. acetic acid anhydride, the preferred procedure is to use the anhydride in boiling condition or in the neighborhood of the boiling point. It is advantageous to use the initial materials in a swollen condition. They are obtained in this condition, for example, if they are dissolved in water or other solvents for the polymerizates, e.g. carboxylic acids such as formic acid or acetic acid or their mixtures with water, and are precipitated with non-solvents for the initial substances, e.g. alcohols or ketones. The swelling media are removed before the boiling temperature of the anhydride is reached. There are therefore preferably used such swelling media as are volatile below the boiling temperature of the anhydride. The water-soluble polymerizates are preferably introduced into a mildly heated carboxylic acid anhydride and the temperature is then raised until the anhydride boils.

The tendency to swell in water still remaining after the treatment with hot or boiling anhydride can be eliminated through subsequent heating of the final product, e.g. to 150–200° C. and up.

The products obtained according to the invention can be worked up, in a conventional manner employed for plastic masses, to shapes, threads, films and the like, and into varnishes.

*Example 1*

Water-soluble polyacrylamide is heated in boiling acetic acid anhydride for 15–20 minutes. The product obtained after rinsing and drying is insoluble in water.

*Example 2*

Water-soluble polyacrylamide or a copolymer of same with polyacrylonitrile is dissolved in water and precipitated with methanol or acetone. The polymerizate moist with the solvent is placed in hot acetic acid anhydride and then into boiling acetic acid anhydride and heated for 15–20 minutes. After rinsing and drying the product it is noted that it is only slightly swellable. The effect is still more improved if it is subsequently further heated for a few minutes to about 170° C.

Instead of acetic acid anhydride it is also possible to use in the instant case, e.g. a mixed anhydride of acetic acid and capronic acid.

*Example 3*

Water-soluble polyacrylamide, or a copolymer as mentioned above, is dissolved in acetic acid or in formic acid and precipitated with methanol or acetone. The swollen polymerizate is further treated as in Example 2.

*Example 4*

Polyacrylamide or a copolymer with polyacrylonitrile, which is swollen in water or dissolved in water, is heated for some time to 200–250° C. A product is obtained which is still slightly swellable in water.

Although certain specific examples are given herein for purposes of illustration, it will be evident to those skilled in the art that the invention is capable of various modifications and adaptations within the scope of the appended claims.

The invention claimed is:

1. Process for producing water insoluble nitrogen-containing polymerizates from a water soluble substance selected from the group consisting of polyacrylamide and copolymers of polyacrylamide and polyacrylonitrile, which consists in heating said substance to a temperature of 100–250° C. in a mixture with a carboxylic acid anhydride only until said substance becomes insoluble in water.

2. Process according to claim 1 in which the carboxylic acid anhydride is acetic acid anhydride.

3. Process according to claim 1 in which the carboxylic acid anhydride is a mixed anhydride of acetic acid and capronic acid.

4. Process according to claim 1, in which the heating of said substance takes place in the absence of oxidizing gases.

References Cited in the file of this patent

UNITED STATES PATENTS

| | | |
|---|---|---|
| 2,173,005 | Strain | Sept. 12, 1939 |
| 2,486,190 | Minsk et al. | Oct. 25, 1949 |
| 2,486,192 | Minsk et al. | Oct. 25, 1949 |

FOREIGN PATENTS

| | | |
|---|---|---|
| 467,402 | Great Britain | June 11, 1937 |
| 716,322 | Germany | Jan. 20, 1942 |

OTHER REFERENCES

Staudinger et al.: Helvetica Chimica Acta (1929), page 1132. Copy in Scientific Library.

R. C. Houtz: Textile Research Jour., vol. 20 (1950), pages 786–801. (Copy in Sci. Library.)

Schildknecht: "Vinyl and Related Polymers," pages 314–318, Wiley, 1952. Copy in Scientific Library.